US010432738B2

(12) United States Patent
Lipka

(10) Patent No.: US 10,432,738 B2
(45) Date of Patent: *Oct. 1, 2019

(54) DYNAMIC RULE ALLOCATION FOR VISITOR IDENTIFICATION

(71) Applicant: ADOBE INC., San Jose, CA (US)

(72) Inventor: Nedim Lipka, Santa Clara, CA (US)

(73) Assignee: Adobe, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,081

(22) Filed: Aug. 14, 2018

(65) Prior Publication Data

US 2019/0007509 A1 Jan. 3, 2019

Related U.S. Application Data

(63) Continuation of application No. 15/003,108, filed on Jan. 21, 2016, now Pat. No. 10,097,652.

(51) Int. Cl.
*G06F 15/173* (2006.01)
*H04L 29/08* (2006.01)

(52) U.S. Cl.
CPC .............. *H04L 67/22* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2006/0265495 A1 | 11/2006 | Butler et al. | |
| 2008/0306830 A1* | 12/2008 | Lasa | G06Q 30/02 705/14.16 |
| 2009/0204704 A1* | 8/2009 | Muret | H04L 67/22 709/224 |
| 2010/0228850 A1 | 9/2010 | Fomitchev | |
| 2015/0127720 A1* | 5/2015 | Glommen | H04L 67/10 709/203 |
| 2016/0140627 A1* | 5/2016 | Moreau | G06Q 30/0282 705/7.32 |

* cited by examiner

*Primary Examiner* — Mohamed Ibrahim
(74) *Attorney, Agent, or Firm* — Shook, Hardy & Bacon, LLP

(57) ABSTRACT

Embodiments of the present invention relate to identifying website visitors. Initially, a predictor is trained with a set of data of known website visitors to identify a rule with the highest effectiveness score. To do so, each rule in a set of rules is applied to all cookies in the set of data. Based on a selected goal of identifying unknown website visitors, the rule with the highest effectiveness score is identified. To identify a cookie of an unknown website visitor, a cookie representation corresponding to the cookie is identified. The cookie representation represents the cookie as an n-dimensional vector of features and is computed using hit statistics for various aspects of the cookie. Utilizing the cookie representation, a cookie-stitching rule is selected and applied to the cookie. In this way, a website visitor associated with the cookie can be identified.

19 Claims, 4 Drawing Sheets

//DYNAMIC RULE ALLOCATION FOR VISITOR IDENTIFICATION

CROSS-REFERENCE TO RELATED APPLICATIONS

This application claims priority to and the benefit of U.S. Nonprovisional application Ser. No. 15/003,108, filed Jan. 21, 2016, and titled "Dynamic Rule Allocation for Visitor Identification", which is incorporated by reference in its entirety.

BACKGROUND

Identifying website visitors is becoming more challenging. For example, many people interact with websites using multiple devices, multiple browsers, or multiple applications. These interactions may result in a small piece of data (i.e., a cookie) being sent from the website to the device, browser, or application. The cookies enable the website to remember information about the user (e.g., user history, user activity, passwords and other form content entered by a user, and tracking information). However, many people delete cookies or activate private browsing. Not knowing which cookies (or devices) belong to a particular website visitor decreases the performance of various functions, including targeting, analytics, and campaign design. For example, the accuracy of various marketing tools suffers as they rely on erroneous assignment of cookies to visitor identities.

Current proprietary solutions typically rely on persistent identification (ID) mechanisms, such as a FACEBOOK, GOOGLE, or APPLE ID. However, these solutions are only beneficial to the company providing the proprietary ID. Current independent solutions typically rely on near-duplicate detection. In near duplicate detection, a pair-wise similarity model, a hashing model, or an approximate nearest neighbor model is used to determine whether a pair of cookies represents the same or different visitor(s). However, given the scale at which most websites receive cookies, the effectiveness and feasibility of such solutions are inadequate.

SUMMARY

Embodiments of the present invention relate to identifying website visitors by dynamically selecting the most effective cookie-stitching rules based on the characteristics of cookies. Initially, a predictor (e.g., a classifier) is trained with a set of data corresponding to known website visitors to identify rules that are, from a statistical perspective, the most accurate rules for identifying the website visitors. To do so, a cookie representation that represents each cookie in a numeric vector space is computed based on hits in log data (e.g., frequency of connected IP addresses) and a selection of variables (e.g., frequency of co-occurring zip codes, user agents, and the like). Each rule in a set of rules is then applied to all cookies in the set of data. Based on the goal (e.g., precision, recall, F-beta measure) of identifying unknown website visitors, the rule with the highest effectiveness score is identified for each cookie. In this way, the effectiveness score for identifying each cookie is measured by determining the precision, recall, or F-beta measure for each rule that is applied to the cookie. The rule that has the highest precision, recall, or F-beta measure for a given cookie has the highest effectiveness score. These rules may then be imputed to each corresponding cookie representation.

To identify a cookie of an unknown website visitor, a cookie representation corresponding to the cookie is computed as described above. Utilizing the cookie representation, the cookie-stitching rule that is most effective at identifying cookies based on cookie representations with similar numeric vectors can be selected and applied to the cookie. In this way, a website visitor associated with the cookie can be identified.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
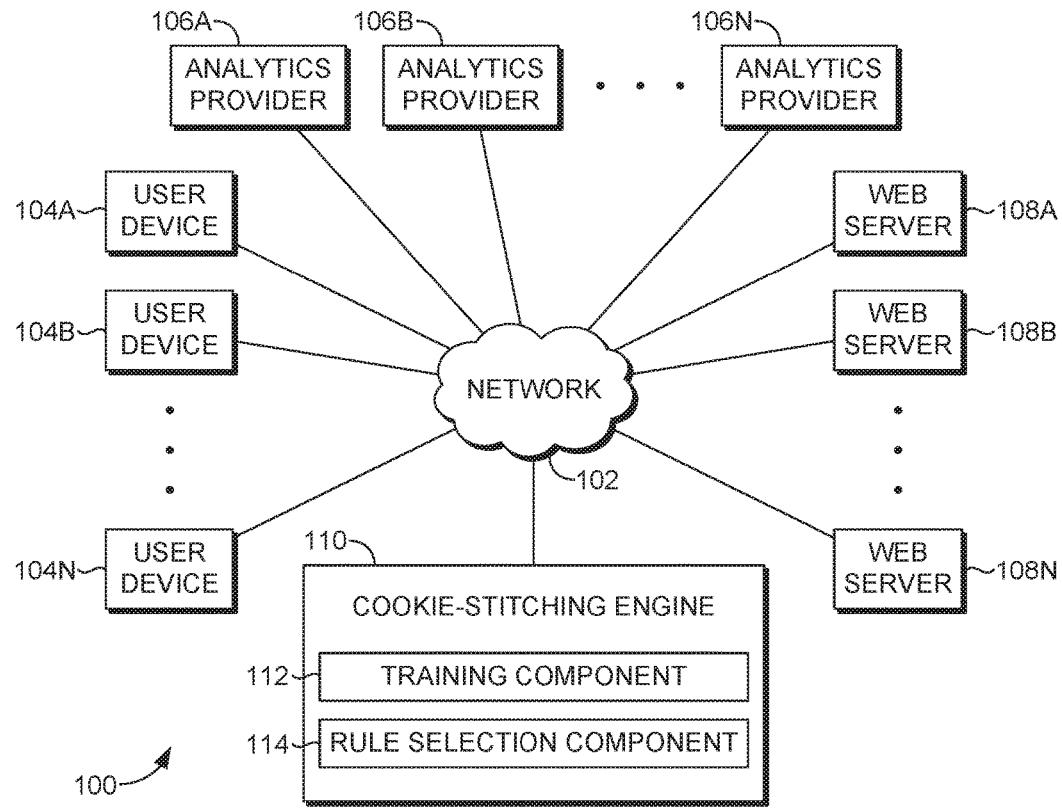
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed previously, identifying website visitors is particularly useful for targeting, analytics, and campaign design purposes. However, current proprietary solutions typically rely on persistent identification (ID) mechanisms (e.g., authentication information associated with other providers), such as a FACEBOOK, GOOGLE, or APPLE ID, which are only beneficial to the company providing the proprietary ID. Further, the effectiveness and feasibility of other solutions that rely on near-duplicate detection are inadequate.

Embodiments of the present invention generally relate to identifying website visitors by dynamically selecting the most effective cookie-stitching rules based on the characteristics of cookies. A cookie-stitching rule is able to assign a label (e.g., identifies a user, physical device ID, and operating system ID, and the like) based on "stitched together" cookies as represented by a cookie representation, described below. During training, given a set of labeled cookies (i.e., cookies from known website visitors), a predictor of effectiveness scores can be trained for each rule in a set of cookie-stitching rules to identify rules that are, based on the characteristics of the cookies, the most accurate for identifying website visitors. The effectiveness score represents how effective a particular rule from the set of rules will be in identifying the website visitor associated with a given cookie.

For each cookie, a cookie representation is identified that represents a cookie. The cookie representation corresponds to cookie statistics (e.g., a hit count) under a numeric vector space. In this way, the cookie representation may correspond to a frequency of hits in log data (e.g., a record that may be created according to an implemented logging policy by a web server or analytics service). The cookie representation may further correspond to a frequency of variables (e.g., zip codes, IP addresses, user agents, and the like) in log data. For example, a cookie may have five hits in the log data corresponding to a particular location, such as a zip code. The hit count and, thus, the cookie representation for zip code may be represented by the number five. In a similar fashion, the cookie may have seven hits corresponding to a particular IP address. The hit count and, thus, the cookie representation for IP address may be represented by the number seven.

During testing, utilizing a cookie representation for an unknown visitor, the predictor selects a cookie-stitching rule that is most effective at identifying cookies with similar cookie representations. The cookie-stitching rule can then be applied to the cookie. The cookie-stitching rule selected may vary based on a predicted effectiveness score for a particular selected goal. For example, a particular business may want higher precision in identifying website visitors. In another example, the particular business instead may want higher recall. In yet another example, the particular business may want a tradeoff between precision and recall (e.g., F-beta measure). In each instance, it is up to the business to select the goal of identifying website visitors (which may result in more/less true/false positives or more/less true/false negatives). Each rule in the set of cookie-stitching rules is applied to the cookie, and a cookie-stitching rule that has the highest effectiveness score for the selected goal is selected. Once the cookie-stitching rule is selected, it is applied to the cookie, and a website visitor associated with the cookie can be identified based on the log data.

As described herein, embodiments of the present invention provide many improvements to solving the visitor identification problem. High precision rules can be created by considering the top n values of a variable (e.g., zip codes, IP addresses, user agents, and the like) simultaneously instead of a single value, which is important for cross-device cookie stitching (where cookies may be received from a single user using multiple devices). Cross-device cookie stitching is a particularly difficult problem as the only shared cookie characteristics are IP addresses and location-based features. However, IP addresses and/or location-based features tend to lead to low precision results in dense visitor areas. By considering the top n values of IP address and/or location-based features, higher precision results, which can be effective for other types of visitor identification solutions as well. Further, the rules combine location, time, and other aspects in the form of labels that represent visitor identities. The time complexity of the solution, in particular the cookie representation, is linear in the number of records in the log data. The statistics used for representing the cookies are designed in a way that they can be computed in a fixed amount of iterations of the data. Furthermore, no indexing of cookies is required. The solution can be implemented efficiently by filtering and sorting data (e.g., variables in the log data) and counting the frequency of the sorted data (e.g., a map/reduce fashion). Additionally, no pair-wise similarity computation is required because labels are directly assigned to cookies and used as identifiers.

In some embodiments, results from other visitor identification solutions can be leveraged and operate as a meta-visitor-identification solution. Visitor identifiers (or labels) from other visitor identification solutions can be added to the log data. The identifiers can function as additional aspects for the cookie representation and as input for rules. For example, a third party provider and some alternative internal solution may compute visitor identifiers for all cookies that are added to the data. Rules based on this enhancement might be considered (e.g., by selecting the identifier of a solution(s) or combining the identifiers of the added solutions in the form of a concatenation). The proposed framework evaluates the effectiveness of the introduced rules and selects the best rule based on the cookie representation at testing.

A general representation of cookies and aspects is represented under a numeric vector space. This cookie representation captures characteristics of variables that occur in the data. This is useful for the dynamic rule allocation but can also be used for advanced analytics. For example, a new analytics feature can categorize or cluster IP addresses by their type and show how many visitors use public versus private IP addresses, and the like. Aspects of the cookie representation can be represented by statistics of co-occurring aspects. In this way, an IP address can be represented by the number of distinct visitors and a threshold can be used to categorize if it is public (used by a variety of visitors) or private (used by a single visitor or household). Additional examples of analytics that can be identified by characteristics of variables that occur in the data may include the categorization of user agent strings (e.g., application, operating system, and/or device identifying characteristics); standard (common) versus personalized device setup; mobile versus stationary devices based on the number of distinct ZIP codes that co-occur with the IP addresses; and the categorization of ZIP codes (e.g., mall versus company versus urban area) based on the number of mobile and stationary devices, etc. Further, although the cookie representation is used herein to identify a website visitor, an application, or a device, it is also contemplated that the cookie representation could be similarly used to identify a physical device ID, an operating system ID, and the like.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as system 100.

The system 100 of FIG. 1 includes user devices 104A-104N, analytics providers 106A-106N, web servers 108A-108N, and a cookie-stitching engine 110. Each of the user devices 104A-104N, analytics providers 106A-106N, web servers 108A-108N, and a cookie-stitching engine 110 may be, or include, any type of computing device (or portion thereof) such as computing device 500 described with reference to FIG. 5, for example. The components may communicate with each other via a network 102, which may include, without limitation, one or more local area networks (LANs) and/or wide area networks (WANs). Such networking environments are commonplace in offices, enterprise-wide computer networks, intranets, and the Internet. It should be understood that any number of user devices, analytics providers, web servers, and cookie-stitching engines may be employed within the system 100 within the scope of the present invention. Each may comprise a single device or multiple devices cooperating in a distributed environment. For instance, the cookie-stitching engine 110 may be provided via multiple devices arranged in a distributed environment that collectively provide the functionality described herein. Additionally, other components not shown may also be included within the system 100, while components shown in FIG. 1 may be omitted in some embodiments.

The user device(s) 104A-104N may be any type of computing device owned and/or operated by a website visitor that can access web server(s) 108A-108N, such as via network 102. For instance, the user device(s) 104A-104N may be a desktop computer, a laptop computer, a tablet computer, a mobile device, or any other device having network access. Generally, a website visitor may employ the user device(s) 104A-104N to, among other things, access or interact with a web page, an application, a service, or the like, that may be hosted or provided by web server(s) 108A-108N. For example, the website visitor may employ a web browser on the user device(s) 104A-104N to access or interact with a web page, an application, a service hosted or provided by web server(s) 108A-108N. The web server(s) 108A-108N may be any type of server device capable of hosting or providing a web page, an application, a service computing devices for access or interaction by a user device, such as the user device(s) 104A-104N.

The cookie-stitching engine 110 is generally configured to facilitate identifying website visitors. To do so, the cookie-stitching engine 110 selects a cookie-stitching rule that assigns (or stitches) a label to a given cookie. Typically, cookie-stitching engine 110 communicates with the user device(s) 104A-104N, the analytics providers 106A-106N, and/or the web server(s) 108A-108N to train a predictor to identify website visitors. In accordance with embodiments described herein, the cookie-stitching engine 110 can include a training component 112 and a rule selection component 114. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules may be implemented as stand-alone applications. In other embodiments, one or more of the illustrated components/modules may be integrated directly into the operating system of the cookie-stitching engine 110. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the cookie-stitching engine 110 might reside on a server, cluster of servers, or a computing device remote from or integrated with one or more of the remaining components.

The cookie-stitching engine 110 may be any type of computing device, or incorporated into a computing device, that can access a network (e.g., network 102). For instance, the cookie-stitching engine 110 may be a desktop computer, a laptop computer, a tablet computer, a mobile device, a server, or any other device, or portion thereof, having network access. Generally, a business user (e.g., providers of targeting, analytics, and campaign design) may employ the cookie-stitching engine 110 via a user device 104A-104N to, among other things, train a predictor and/or identify an unknown website visitor.

For example, a business user may have access to a collection of known website visitors. The business user may initially employ the cookie-stitching engine 110 to train a predictor to predict effectiveness scores for each rule in a set of cookie-stitching rules for accurately identifying a website visitor. The business user may further specify goals that may result in varying effectiveness scores for each rule. Once the predictor is trained, the business user may utilize the cookie-stitching engine 110 to predict the most effective cookie-stitching rule to identify an unknown website visitor. Based on a selected goal, the most effective cookie-stitching rule may vary. Accordingly, the most effective cookie-stitching rule is applied, and the unknown website visitor is identified.

As previously mentioned, in embodiments, the cookie-stitching engine 110 includes a training component 112 and a rule selection component 114 to facilitate identifying website visitors. The training component 112 is generally configured to train a predictor to predict effectiveness scores for each rule in a set of rules for accurately identifying a website visitor. In particular, training component 112 communicates initially with analytics provider(s) 106A-106N to acquire a set of data regarding known website visitors. The information may be in the form of log data and includes labels identifying the web site visitors. The log data may include cookie statistics such as a hit count. The log data may additionally include other aspects, such as user agent information (e.g., device types, operating system, browser version, and the like), location information (e.g., IP addresses, zip codes, city, state, and the like).

Utilizing the set of data 114, the training component 112 evaluates each rule in a set of rules based on a goal. As noted previously, the goal may comprise recall, precision, or F-beta measure. Generally, to evaluate each rule, a cookie representation is determined for each cookie in the set of data. The cookie representation represents the cookie in a numeric vector space. Essentially, the cookie representation corresponds to a hit count in the log data for each aspect or cookie. Based on the known labels, each rule can be evaluated and train the predictor to identify the most effective rules based on the cookie representation (i.e., the numeric vector). Thus, a predictor (e.g., a classifier) is generated that comprises the score predictors.

The rule selection component 114 is generally configured to deploy the classifier comprising the score predictors to dynamically select the predicted most effective rule for each cookie for an unknown website visitor. To do so, each cookie for an unknown website visitor is represented by a cookie representation. As described above, a cookie representation represents the cookie in a numeric vector space corresponding to a hit count in the log data for each aspect or cookie. The rule selection component 114 applies the classifier to each cookie. In this way, given a cookie representation, effectiveness scores are predicted for each rule in the set of rules. The rule with the highest predicted score is selected and applied to the cookie. Thus, a label is assigned by the rule selection component 114 to the cookie, and the website visitor is identified.

Figure 2:
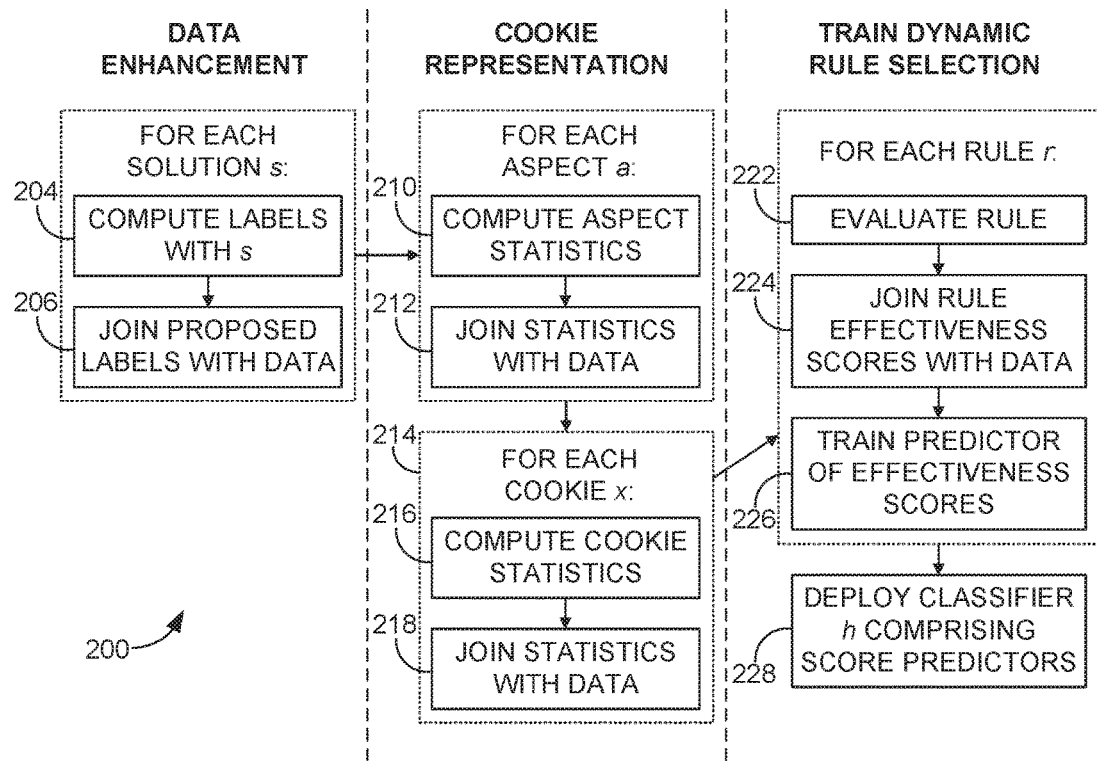
FIG. 2 is a flow diagram showing a method for enhancing an original data set with results from external solutions, representing cookies, and building a rule selector, in accordance with an embodiment of the present invention.

Referring now to FIG. 2, a flow diagram is provided that illustrates a method 200 for enhancing an original data set with results from external solutions, representing cookies, and building a predictor, in accordance with an embodiment of the present invention. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be provided as part of a cookie-stitching system, such as system 100 of FIG. 1.

Initially, the data set can be enhanced with additional aspect domains (e.g., data from other visitor identification solutions). In this way, the hits data can be enhanced by an identifier for the connected components of the corresponding cookies (e.g., an identifier that shows relationships between common data shared by different cookies). For example, the log data may reveal that cookie 1 corresponds to IP address 1, cookie 2 corresponds to IP address 1 and IP address 2, and cookie 3 corresponds to IP address 2. By utilizing connected components, it can be inferred that cookies 1, 2, and 3 are connected based on their correspondence to shared IP addresses. In other words, the identification of connected components can help identify cookies associated with the same website visitor, which may increase the recall of a visitor identification solution. Further, the utilization of connected components can be considered for other domains (e.g., using a data from a different visitor identification solution) as well.

Once the hits data is enhanced by additional aspect domains that might be inferred from other visitor identification solutions or data enhancement services, additional labels for the cookie representation can be computed, at block 204. These labels may be joined with the data, at block 206, and the added values can be dynamically selected and used directly or in combination with other aspects as cookie labels. In this way, labels from other visitor identification solution can be selected based on the context of a cookie and its associated aspects, as may be expressed by its cookie representation.

In some embodiments, aspects are represented under their statistical properties observed in the collected data, which can be inferred without requiring cookies from identified visitors. However, the training process utilizes cookies from identified visitors (i.e., ground-truth data) in order to estimate the effectiveness of the considered rules.

Hit-statistics of aspects may be part of the cookie representation. Any selected aspect is represented by computing, at block 210, the statistics of co-occurring selected aspects from other aspect domains. For example, an IP address might be represented by the maximum/minimum frequencies of co-occurring postal codes, user agents, cookies and the like. In some embodiments, the mentioned feature computations may be reused by considering one or more aspects, possibly the most recently or most frequently used aspect. In one example, characteristics of the most used IP address may be expressed by the following:

$$a_{(1)} > f_{(a,x)} a_{(2)} > f_{(a,x)} a_{(3)} > f_{(a,x)} \ldots$$

where $a=a_{(1)}$. Frequencies of co-occurring user agents can be expressed by:

$$x_i := |\{a'\}|, a' \in \text{hits}(a) \%\text{hits}(a'), a' \in D_{ua}$$

As can be appreciated, other features can be computed analogously and joined with the data, at block 212, as part of the cookie representation.

As shown at block 214, a cookie x is represented by cookie representation x. The cookie representation x is encoded as an n-dimensional vector of features. At block 216, a feature $x_i$ represents a computed statistic of hits of a cookie. A hit t∈hits(x) is a record in the log data that may be created according to an implemented logging policy by a web server or analytics service. The computed statistics can be joined with the data, at block 218, as part of the cookie representation. Aspects that may be captured in a hit may include, for example, IP addresses, user agent information, geographical information (e.g., state, country, city, postal code, and the like). In this way, an aspect a ∈D is a value (e.g., 174.12.123.1) that is an element of the corresponding aspect domain D (e.g., IP address).

By way of example, let $D_{ip} \in D$ denote the domain of IP addresses, $D_{ua} \in D$ denote the domain of user agents, etc., whereby D is a selected set of domains that are captured or inferred from the log data. In the following, $D_{ip}$ is used as a concrete example domain in order to introduce features of the cookie representation. In this regard, hit-statistics for a cookie x may include, but are not limited to:

the frequencies of connected IP addresses, $x_{j:=|\{a\}|}$, $a_\epsilon$ hits($_x$), $a_\epsilon D_{ip}$;

the maximum, minimum, average, or variance of IP-address frequencies, e.g., $x_i:=\max f(a, x)$, a∈hits (x), where f(a,x) is the frequency of aspect a in the hits associated with cookie x (alternatively, in some embodiments, f can be a logarithmically scaled frequency);

the differences of ranked IP-address frequencies, $a_{(1)} > f_{(a,x)} a_{(2)} > f_{(a,x)} a_{(3)} > f_{(a,x)} \ldots$, $x_i = f(a_{(i+1)}, x) - f(a_{(i)}, x)$, with i∈{0 . . . m} and m is the number of ranks (the symbol>f (a,x) indicates a ranking of elements by frequency); and the relative differences of ranked IP-address frequencies, mf=max f(a,x), a∈hits(x), $$a_{(1)} > f_{(a,x)} a_{(2)} > f_{(a,x)} a_{(3)} > f_{(a,x)} \cdots, x_i = \frac{f(a_{(i+1)}, x_i) - f(a_{(i)}, x)}{mf}$$

As used herein, a rule r is a subjective function, r: x 1→l, that assigns a label/to cookie x, where l is used as an identifier of the visitor that owns x. A set of 'stitching' rules R is used to cover a variety of stitching scenarios. For example, the rule: $r_{ip(1)}$: X 1→{l|l is the most frequently used IP address by a cookie} maps a cookie to its most frequently used IP address. In other examples: $r_{cc}$: X 1→{l|l is the connected component identifier of a cookie}, $r_{ip(1)ip(2)}$: X 1→{l|l are the top two most frequently used IP addresses by a cookie}, $r_{ua(1)cc}$: X 1→{l|l is the most frequently used user agent by a cookie and its connected component}.

At block 222, each rule in the set of rules is evaluated for each cookie in the training data set. As described above, the rules may be evaluated based on a selected goal. For each goal, the evaluation yields an effectiveness score for each rule and for each cookie that can be joined with the data at block 224. Given known data (e.g., a ground-truth), a predictor can be trained to identify the most effective rule for a particular cookie representation, at block 226. As a result, a classifier h comprising the score predictors can be deployed, at block 228.

While existing solutions are limited to singular manifestations of aspects for similarity computations, in some embodiments, rules with top n aspects are utilized as labels. In some embodiments, rules can also be interpreted as binary similarity functions with a narrow feature space. In this way, cookies are similar if they are mapped to the same label; otherwise, they are dissimilar. Rules can further be modified to provide a c-neighborhood for highly similar cookies by mapping the inferred label to a more abstract label. For example, a time-stamp that might be used as a label (possibly in combination with other aspects) can be mapped to morning/evening and/or weekday/weekend. Similarly, GPS coordinates might be mapped to stripped coordinates by removing the last m digits. Further, a user agent string might be parsed and mapped to the operating system.

Figure 3:
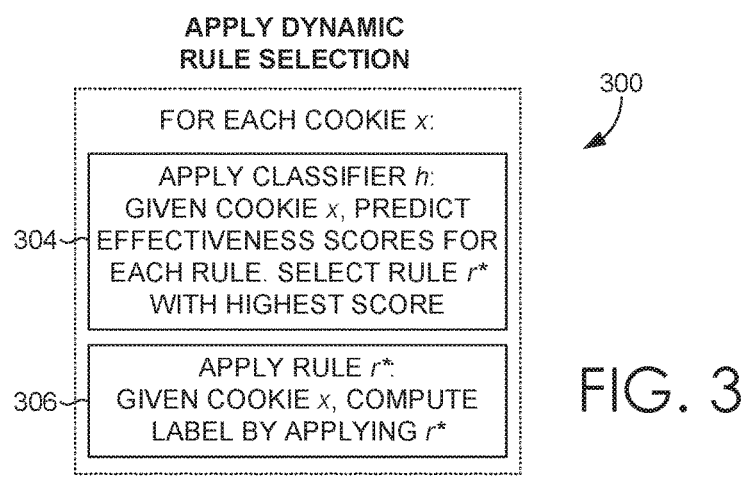
FIG. 3 is a flow diagram showing a method for applying a trained rule selector in order to infer a cookie label that represents the corresponding visitor identity, in accordance with an embodiment of the present invention.

Turning now to FIG. 3, a flow diagram is provided that illustrates a method 300 for applying a trained rule selector in order to infer a cookie label that represents the corresponding visitor identity, in accordance with an embodiment of the present invention. Such a method can be performed, for example, by a cookie-stitching system, such as system 100 of FIG. 1. As can be appreciated, additional or alternative steps may also be included in different embodiments. At application time, a classifier h decides, at block 304, which rule r should be applied, based on the cookie vector x. The classifier h allocates the best rule r' for a cookie x by predicting the effectiveness of all rules and by selecting the highest scoring rule: h(x):

$$\underset{i \in R}{\mathrm{argmax}} h_i(x).$$

At block 306, the rule is applied to the cookie, and the cookie is labeled.

Figure 4:
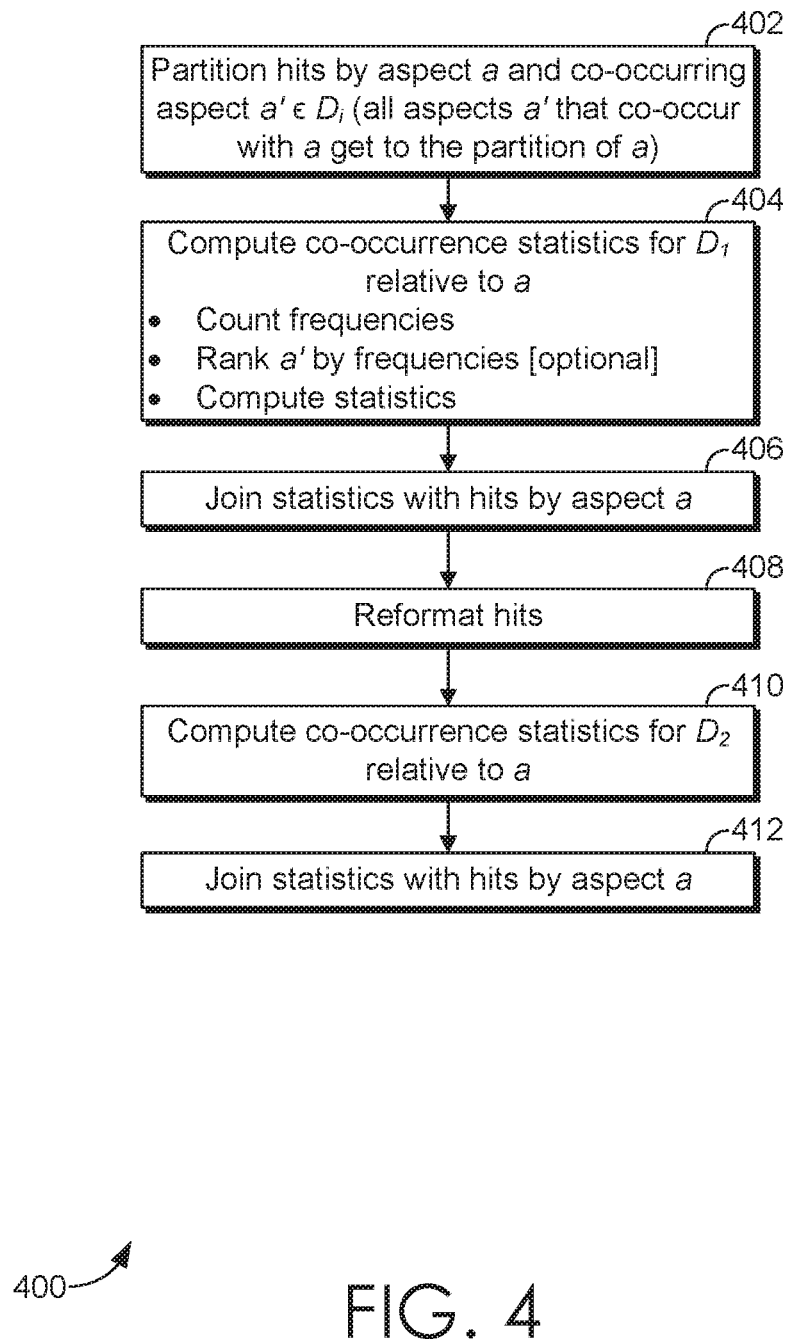
FIG. 4 is a flow diagram showing a method for computing aspect statistics, in accordance with an embodiment of the present invention.

In FIG. 4, a flow diagram is provided that illustrates a method 400 for computing aspect statistics efficiently, in accordance with an embodiment of the present invention. Such a method can be performed, for example, at a cookie-stitching system, such as system 100 of FIG. 1. In implementation, the feature computation as well as the evaluation of rules is parallelized by filtering and sorting data (e.g., variables in the log data) and counting the frequency of the sorted data (e.g., a map/reduce fashion). Some arbitrary solutions in the data enhancement phase and predictors in the training phase of the dynamic rule selection might not be parallelizable. However, the connected component algorithm used for data enhancement and the regressors/classifiers are implemented in the illustrated map/reduce fashion. Aspect a $\in$D can be represented by frequency-based statistics of co-occurring aspects $a'\in D^j$, $D \neq D^j$. Example: $D_1 = D_{ip} = \{z | z$ is an IP address that occurs in the hits data set$\}$.

Initially, at block 402, the hits are partitioned by aspect a and co-occurring aspect $a' \in D_j$ (all aspects a' that co-occur with a get to the partition of a). Co-occurrence statistics can be computed, at block 404, for $D_1$ relative to a. In this way, frequencies are counted, a' may be ranked by frequencies, and the statistics may be computed. At step 406, the statistics are joined with hits by aspect a. The hits are reformatted, at step 408. Co-occurrence statistics are computed for $D_2$ relative to a, at step 410, and the statistics can be joined with hits by aspect a, at step 412. As can be appreciated, this can be repeated for each co-occurring aspect. The particular partitioning by aspects and co-occurring aspects enables an efficient map/reduce computation that reduces the network traffic within a distributed computer cluster. The data that is required for the assessment of aspect statistics becomes available on a single or a small number node(s) of the cluster, and the communication in the cluster is localized.

Having described an overview of embodiments of the present invention, an exemplary computing environment in which some embodiments of the present invention may be implemented is described below in order to provide a general context for various aspects of the present invention.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 5:
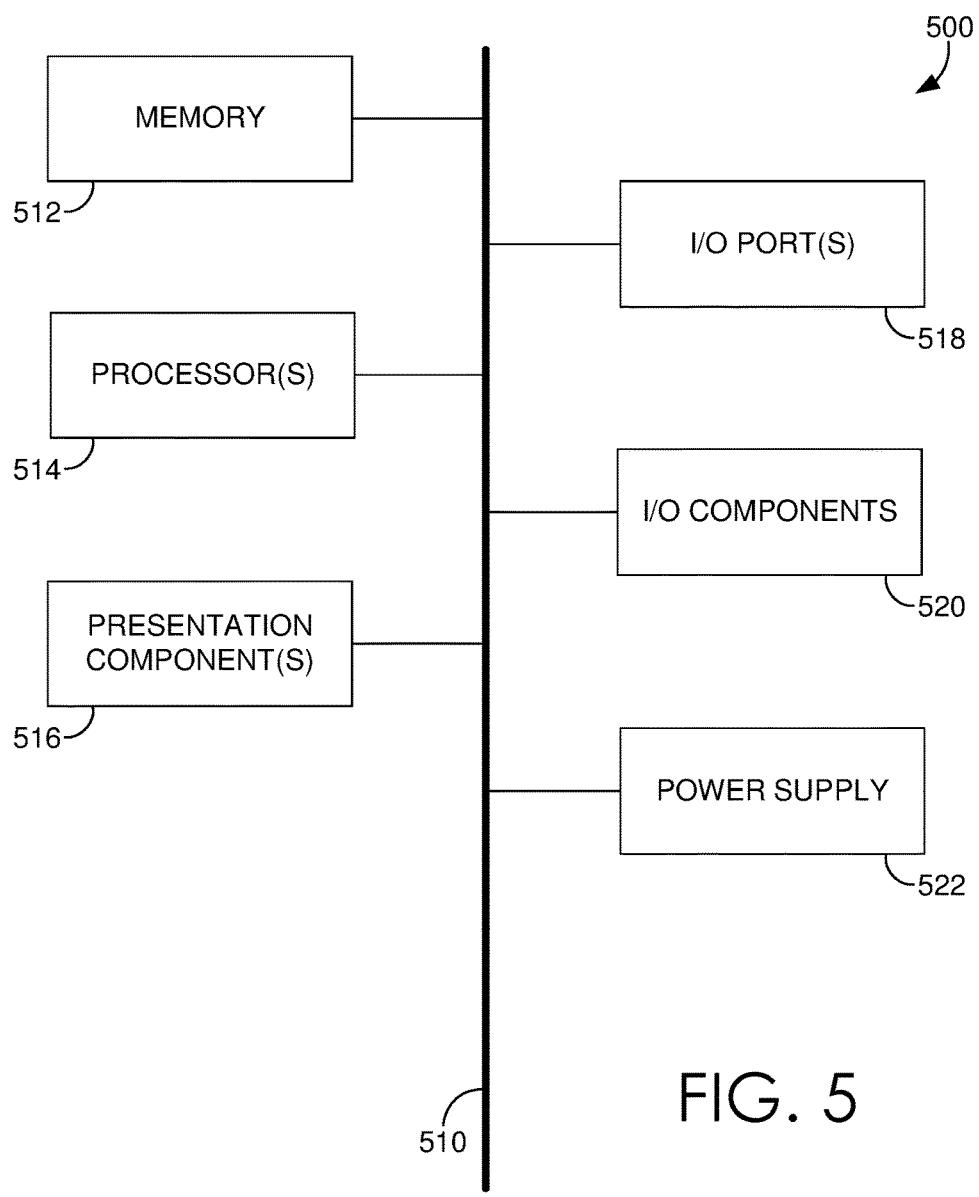
FIG. 5 is a block diagram of an exemplary system in which embodiments of the present invention may be employed.

Accordingly, referring generally to FIG. 5, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

With reference to FIG. 5, computing device 500 includes a bus 510 that directly or indirectly couples the following devices: memory 512, one or more processors 514, one or more presentation components 516, input/output (I/O) ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, embodiments of the present invention provide for, among other things, facilitating budget allocation based on return on investment. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage media storing computer-useable instructions that, when used by one or more computing devices, cause the one or more computing devices to perform operations comprising:
   computing a cookie representation for an unknown website visitor, the cookie representation comprising a n-dimensional vector of features, wherein each feature represents a hit statistic for an aspect of a cookie;
   selecting a cookie-stitching rule for the cookie representation for the unknown website visitor, wherein the cookie-stitching rule is selected from a set of cookie-stitching rules based on effectiveness scores predicted for each cookie-stitching rule and wherein each effectiveness score indicates an effectiveness at identifying website visitors associated with representations similar to the cookie representation; and
   applying the selected cookie-stitching rule to the cookie representation to identify the unknown website visitor associated with the cookie.

2. The non-transitory storage media of claim 1, wherein each effectiveness score is determined by one or more binary-classification evaluation metrics.

3. The non-transitory storage media of claim 2, wherein the one or more binary-classification evaluation metrics correspond to a selected goal.

4. The non-transitory computer storage media of claim 1, wherein the aspects represented in the cookie representation include geographical information, IP address, or user agent.

5. The non-transitory computer storage media of claim 1, wherein the hit statistics includes frequencies of hits, maximum or minimum hit frequencies, differences of ranked hit frequencies, and relative difference of ranked hit frequencies.

6. The non-transitory computer storage media of claim 1, wherein the operations further comprise using a trained classifier to predict effectiveness scores for each cookie-stitching rule within the set of cookie-stitching rules.

7. The non-transitory storage media of claim 1, wherein effectiveness scores are determined by values for recall, precision, and F-beta measure.

8. A computerized method for identifying a website visitor, the computerized method comprising:
   receiving a set of log data for a website from a web server device, the set of log data including cookies and an identification of a known website visitor corresponding to each cookie;
   computing a cookie representation for each cookie under a numeric vector space, wherein each cookie representation comprises a n-dimensional vector of features and wherein each feature represents a hit statistic for an aspect of a particular cookie determined from the set of log data;

evaluating cookie-stitching rules from a set of cookie-stitching rules by applying each cookie-stitching rule to the cookie representations to determine an effectiveness score for each cookie-stitching rule, wherein each effectiveness score measures an effectiveness of a particular cookie-stitching rule at identifying website visitors based on a particular cookie representation;

training a classifier of effectiveness scores for each cookie-stitching rule of the set of cookie-stitching rules; and utilizing the classifier to select a cookie-stitching rule for a new cookie representation corresponding to an unknown website visitor, the cookie-stitching rule being selected based on having the highest effectiveness score for the new cookie representation relative to other cookie-stitching rules.

9. The computerized method of claim 8, wherein each effectiveness score is determined by one or more binary-classification evaluation metrics.

10. The computerized method of claim 9, wherein the one or more binary-classification evaluation metrics correspond to a selected goal.

11. The computerized method of claim 8, wherein the aspects represented in the cookie representation include geographical information, IP address, or user agent.

12. The computerized method of claim 8, wherein the hit statistics includes frequencies of hits, maximum or minimum hit frequencies, differences of ranked hit frequencies, and relative difference of ranked hit frequencies.

13. The computerized method of claim 8, wherein effectiveness scores are determined by values for recall, precision, and F-beta measure.

14. A computerized system comprising:
one or more processors; and
one or more non-transitory computer storage media storing computer-usable instructions that, when used by the one or more processors, cause the one or more processors to:

compute a cookie representation for an unknown website visitor, the cookie representation comprising an n-dimensional vector of features, wherein each feature represents a hit statistic for an aspect of a cookie, wherein the hit statistics includes frequencies of hits, maximum or minimum hit frequencies, differences of ranked hit frequencies, and relative difference of ranked hit frequencies;

select a cookie-stitching rule for the cookie representation for the unknown website visitor, wherein the cookie-stitching rule is selected from a set of cookie-stitching rules based on effectiveness scores predicted for each cookie-stitching rule and wherein each effectiveness score indicates an effectiveness at identifying website visitors associated with representations similar to the cookie representation; and apply the selected cookie-stitching rule to the cookie representation to identify the unknown website visitor associated with the cookie.

15. The computerized system of claim 14, wherein each effectiveness score is determined by one or more binary-classification evaluation metrics.

16. The computerized system of claim 15, wherein the one or more binary-classification evaluation metrics correspond to a selected goal.

17. The computerized system of claim 14, wherein the aspects represented in the cookie representation include geographical information, IP address, or user agent.

18. The computerized system of claim 14, wherein the one or more processors are further caused to use a trained classifier to predict effectiveness scores for each cookie-stitching rule within the set of cookie-stitching rules.

19. The computerized system of claim 14, wherein effectiveness scores are determined by values for recall, precision, and F-beta measure.

* * * * *